(12) United States Patent
Mayer et al.

(10) Patent No.: US 12,547,139 B2
(45) Date of Patent: Feb. 10, 2026

(54) METHOD FOR ACTIVATING OR DEACTIVATING AT LEAST ONE HARDWARE AND/OR SOFTWARE FUNCTIONALITY OF AN AUTOMATION COMPONENT

(71) Applicant: Endress+Hauser Process Solutions AG, Reinach (CH)

(72) Inventors: Michael Mayer, Oberwil (CH); Wolfgang Höferlin, Efringen-Kirchen (DE)

(73) Assignee: Endress+Hauser Process Solutions AG, Reinach (CH)

( * ) Notice: Subject to any disclaimer, the term of this patent is extended or adjusted under 35 U.S.C. 154(b) by 524 days.

(21) Appl. No.: 17/618,978

(22) PCT Filed: May 6, 2020

(86) PCT No.: PCT/EP2020/062534
§ 371 (c)(1),
(2) Date: Dec. 14, 2021

(87) PCT Pub. No.: WO2020/249323
PCT Pub. Date: Dec. 17, 2020

(65) Prior Publication Data
US 2022/0365506 A1 Nov. 17, 2022

(30) Foreign Application Priority Data
Jun. 14, 2019 (DE) ...................... 10 2019 116 209.2

(51) Int. Cl.
*G05B 19/042* (2006.01)
*G06F 21/10* (2013.01)

(52) U.S. Cl.
CPC ......... *G05B 19/0426* (2013.01); *G06F 21/10* (2013.01); *G05B 2219/24165* (2013.01); *G05B 2219/25428* (2013.01)

(58) Field of Classification Search
None
See application file for complete search history.

(56) References Cited

U.S. PATENT DOCUMENTS

| 2004/0064351 A1* | 4/2004 | Mikurak | G06Q 30/0269 705/22 |
| 2015/0215321 A1* | 7/2015 | Fries | G05B 19/4183 726/4 |

(Continued)

FOREIGN PATENT DOCUMENTS

| CN | 101689237 A | 3/2010 |
| CN | 102598730 A | 7/2012 |

(Continued)

*Primary Examiner* — Mohammad Ali
*Assistant Examiner* — Saad M Kabir
(74) *Attorney, Agent, or Firm* — Kelly J. Smith; Endress+Hauser (USA) Holding, Inc.

(57) ABSTRACT

A method for activating or deactivating at least one hardware- and/or software functionality of an automation component having an input unit and an output unit includes: generating an identification information of the automation component; providing the identification information as a first machine interpretable code on the output unit; registering the provided first code using a service device via a reaction free, unidirectional data channel; transmitting the identification information from the service device to a server; generating a first license information using the server; transmitting the first license information as an alphanumeric data sequence of predetermined character length from the server to the service device; inputting the output first license information into the automation component using the input unit; checking the plausibility of the first (Continued)

license information using the automation component; activating or deactivating the hardware- and/or software functionality upon successful checking of the plausibility of the first license information.

12 Claims, 1 Drawing Sheet

(56) References Cited

U.S. PATENT DOCUMENTS

| | | |
|---|---|---|
| 2016/0329058 A1 | 11/2016 | Lynch et al. |
| 2016/0342874 A1 | 11/2016 | Powell et al. |

FOREIGN PATENT DOCUMENTS

| | | |
|---|---|---|
| CN | 102902243 A | 1/2013 |
| CN | 104375473 A | 2/2015 |
| DE | 102009055093 A1 | 6/2011 |
| DE | 102012214018 B3 | 2/2014 |
| DE | 102013013299 A1 | 2/2015 |
| EP | 2573634 A1 | 3/2013 |

\* cited by examiner

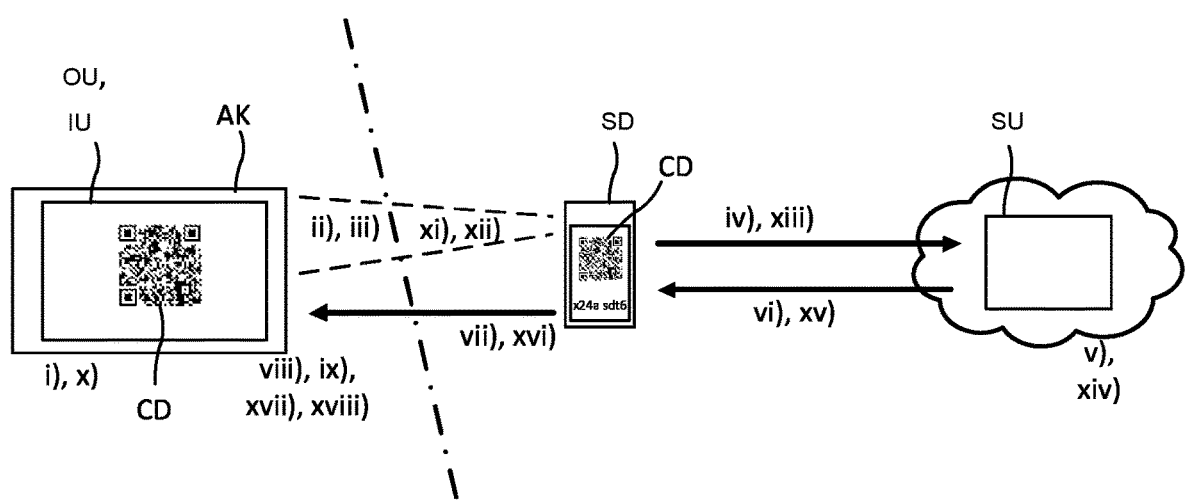

METHOD FOR ACTIVATING OR DEACTIVATING AT LEAST ONE HARDWARE AND/OR SOFTWARE FUNCTIONALITY OF AN AUTOMATION COMPONENT

CROSS-REFERENCE TO RELATED APPLICATIONS

The present application is related to and claims the priority benefit of German Patent Application No. 10 2019 116 209.2, filed on Jun. 14, 2019 and International Patent Application No. PCT/EP2020/062534 filed on May 6, 2020, the entire contents of which are incorporated herein by reference.

TECHNICAL FIELD

The invention relates to a method for activating or deactivating at least one hardware- and/or software functionality of an automation component, wherein the automation component contains an input unit and an output unit.

BACKGROUND

Known from the state of the art are field devices, which are used in industrial plants. In process automation technology, as well as in manufacturing automation technology, field devices are often applied. Referred to as field devices are, in principle, all devices, which are applied near to a process and which deliver, or process, process relevant information. Field devices are used for registering and/or influencing process variables. Serving for registering process variables are measuring devices, or sensors. Such are used, for example, for pressure- and temperature measurement, conductivity measurement, flow measurement, pH measurement, fill level measurement, etc. and register the corresponding process variables, pressure, temperature, conductivity, pH value, fill level, flow, etc. Used for influencing process variables are actuators. Such are, for example, pumps or valves, which can influence the flow of a liquid in a tube or pipe or the fill level in a container. Besides the above mentioned measuring devices and actuators, referred to as field devices are also remote I/Os, radio adapters, and, in general, devices, which are arranged at the field level.

A large number of such field devices are produced and sold by the Endress+Hauser group of companies.

In modern industrial plants, field devices are, as a rule, connected with superordinated units via communication networks, such as, for example, fieldbusses (Profibus®, Foundation® Fieldbus, HART®, etc.). Normally, the superordinated units are control systems, or controllers, such as, for example, a PLC (programmable logic controller). The superordinated units serve, among other things, for process control, process visualizing, process monitoring as well as for commissioning of field devices. The measured values registered by field devices, especially by their sensors, are transmitted via the particular bus system to one or more superordinated units. In addition, also a data transmission from the superordinated unit via the bus system to the field devices is required, especially for configuration and parametering of field devices as well as for operation of actuators.

For servicing of the field devices, corresponding operating programs (operating tools) are necessary, which either run independently in the superordinated units (Endress+ Hauser FieldCare, Pactware, AMS Fisher-Rosemount, PDM Siemens) or are incorporated in control system applications (Siemens PS7, ABB Symphony, Emerson Delta V). Also it is possible to execute the operating programs in a mobile service device, in order so to service the field devices by such means.

For activating and executing the operating program in the particular servicing device, the customer requires a valid license. For activating the operating program, currently a method is used, which requires that data be exchanged between the apparatus and a license server. For this, a USB stick flash memory, for example, is connected with an interface of the corresponding apparatus, wherein data are copied from the apparatus to the USB stick flash memory. The USB stick flash memory is then connected with an Internet capable computer. The data loaded from USB stick flash memory are then transmitted to the license server, which generates a license and sends back activation data. This must then be uploaded per USB stick flash memory to the corresponding apparatus.

The activation-, and licensing procedure is similar in the case of field devices, which, in addition to the basic functionalities (registering process variables, setting a manipulated variable, etc.), offer supplemental functionalities, for example, have expanded functionalities, which can be activated upon purchase by the customer. This holds likewise for additional hardware installed in a field device, for example, additional sensor units.

In the following, all devices, in the case of which a licensing, or activating/deactivating is enabled by means of the described method, are referred to as automation components.

A problem with the above described activation-, and licensing procedure lies in the fact that the component to be activated is frequently located in a critical infrastructure of the plant. Critical means that a failure, or a hacking, of the component to be activated can bring about cost- and time consuming plant outages. For example, the USB stick flash memory might contain dangerous software, such as viruses or trojans, such that the critical infrastructure is attacked, even though, in given cases, it is offline. As an alternative, a license file could be printed in binary form and manually typewritten—this is, however, a user unfriendly and error susceptible method. Additionally, the file to be input could likewise be hacked, such that, for example, components of malware become embedded.

SUMMARY

An object of the invention is a method, which enables a secure and user friendly alternative to the described deactivation/activation- and licensing procedures.

The object is achieved by a method for activating or deactivating at least one hardware- and/or software functionality of an automation component, wherein the automation component contains an input unit and an output unit, comprising:
  i. generating an identification information of the automation component;
  ii. providing the identification information as a first, machine interpretable code on the output unit of the automation component;
  iii. registering the provided first code by means of a service device via a reaction free, unidirectional data channel;
  iv. transmitting the identification information from the service device to a server;
  v. generating a first license information by means of the server or another unit communicating with the server;

vi. transmitting the first license information as an alphanumeric data sequence of predetermined character length from the server to the service device;
vii. inputting the output first license information into the automation component by means of the input unit;
viii. checking the plausibility of the first license information by means of the automation component; and
ix. activating or deactivating the hardware- and/or software functionality upon successful checking of the plausibility of the first license information.

By means of the method of the invention, a secure activating/licensing of a hardware- and/or software functionality of an automation component is enabled. No longer is a hackable media, e.g., for example, a USB stick flash drive, required, via which the automation component could be hacked, or malware loaded. For transmitting the information (for example, type of hardware- and/or software functionality, or identification information such as the type of automation component, the serial number of the automation component, user information, etc.), which the server requires, in order to be able to create the license information, a unidirectional data channel is established, via which this information is provided as machine interpretable code. Advantageously in this connection, it is provided that it is not possible to access the automation component via such data channel.

The server then creates the license information, which is output in the form of an alphanumeric data sequence to the operator, for example, visually via a display unit of the service device or acoustically as an audio signal of the service device. The length of the character sequence is selected in such a manner that it can still be input comfortably by the operator, however, sufficiently long that the license information cannot be validly input by guessing. It can be provided that the operator is told earlier, for example, by a corresponding entry in the reference manual, what the format or structure of the character sequence will be (for example, the length of the character sequence; sections, in which only numbers are provided; sections, in which only letters are provided; etc.) such that the operator can rapidly perform a first plausibility check of the license information output to it.

Alternatively, also a deactivating by means of the method of the invention is possible. For example, a hardware- and/or software functionality can be operable in a limited mode. By performing the method, a deactivating of the limited mode is possible.

In an advantageous embodiment of the method of the invention, it is provided that the hardware- and/or software functionality is activated only temporarily for a predetermined length of time. After passage of the length of time, the hardware- and/or software functionality is deactivated and must be activated anew by means of the method described in claim 1. It can be provided that the length of time is already predetermined in the software or in the hardware. Alternatively, the length of time is encoded in the alphanumeric data sequence of the first license information.

An advantageous, additional development of the method of the invention further comprises:
x. generating an acknowledgment request of the automation component, wherein the acknowledgment request is created only upon successful checking of the plausibility of the first license information;
xi. providing the acknowledgment request on the output unit of the automation component as a second machine interpretable code;
xii. registering the provided second machine interpretable code by means of the service device via a reaction free, unidirectional data channel;
xiii. transmitting the acknowledgment request from the service device to a server;
xiv. generating an acknowledgment information by means of the server;
xv. transmitting the acknowledgment information as an alphanumeric data sequence of predetermined character length from the server to the service device;
xvi. inputting the output acknowledgment information into the automation component by means of the input unit;
xvii. checking the plausibility of the acknowledgment information by means of the automation component; and
xviii. time unlimited activating or deactivating of the hardware- and/or software functionality upon successful checking of the plausibility of the acknowledgment information.

For complete activating, or deactivating, of the hardware- and/or software functionality, it is, thus, required that the activation procedure be repeated successfully. Transmitted to the server in the above described manner is an acknowledgment request, or acknowledgment query, whereupon server generates an acknowledgment information. The registering of the acknowledgment request by the service device and the inputting of the acknowledgment information by means of the input unit occurs analogously to the initial activating.

In a first variant of the method of the invention, it is provided that an optical code, especially a QR code, a flicker code, or a barcode, is used as a first code and/or as a second code, and a display unit, especially a display, is used as output unit. Besides these examples of optical code, naturally any other type of optical code can be used.

In an advantageous embodiment of the first variant of the method of the invention, it is provided that the service device has a camera and the reaction free, unidirectional data channel is formed in that the camera registers the first optical code, or the second optical code, as the case may be. In this way, the operator is not enabled to access the automation component from the service device via the data channel.

In a second variant of the method of the invention, it is provided that an acoustic playback means is used as output unit and an acoustic frequency modulated and/or amplitude modulated audio signal is used as a first code and/or as second code. Also a frequency shift keying modulation, a multifrequency coding or a pulse code modulation can are used.

In an advantageous embodiment of the second variant of the method of the invention, it is provided that the service device has an acoustic receiving means, especially a microphone, and the reaction free, unidirectional data channel is formed in that the acoustic receiving means hears the first acoustic code, or the second acoustic code, as the case may be. Also in this case, it is not possible for the operator to access the automation component from the service device via the data channel.

Alternatively, the transmitting of the first, or second, code can also be performed by electromagnetic transmission. In this case, it needs to be assured that the transmission channel is embodied exclusively unidirectionally.

In an advantageous embodiment of the method of the invention, it is provided that the activating, or deactivating, of the hardware- and/or software functionality supplementally only occurs in cases in which the inputting of the output first license information occurs within a predetermined length of time after the generating of the identification information of the automation component. If the first license information is only input after the predetermined length of time, then the method must be repeated.

In a preferred embodiment of the method of the invention, it is provided that the time unlimited activating, or deactivating, of the hardware- and/or software functionality supplementally only occurs when the inputting of the output second license information occurs within a predetermined length of time after the generating of the acknowledgment information of the automation component.

These two embodiments further decrease the possibility of a hacking of the method. Since the license information to be input is always an alphanumeric data sequence of smaller length (for example, between 6 and 8 characters), an operator could by guessing input a valid license information. By imposing a time limit, the probability of successful guessing is reduced.

In an advantageous embodiment of the method of the invention, the service device is a laptop or a mobile end device. Examples of mobile end devices are, for example, smartphones or tablet PCs.

In an advantageous embodiment of the method of the invention, the service device is connected for communication with the server via Internet.

In an advantageous embodiment of the method of the invention, the automation component is a field device utilizing a basic functionality for registering or setting a variable of a process, in which a product is made from a raw or starting material by the application of chemical, physical or biological procedures, wherein the hardware- and/or software functionality is one of the following:
  specific measuring functionality;
  diagnostic functionality;
  parametering the field device;
  verifying the field device;
  validation of the field device;
  calibrating the field device;
  adjusting;
  documentation of the field device;
  loop-test;
  safety functions;
  start-up of the field device;
  shutting down the field device;
  servicing the field device;
  installing the field device;
  replacing the field device with another field device;
  commissioning the field device;
  maintenance of the field device;
  firmware updating;
  software updating;
  license updating.

Examples of field devices have already been given in the introduction above. Serving as input unit in this variant are keys on the field device housing.

In an alternative, advantageous embodiment of the method of the invention, it is provided that the automation component is a service device, in which an operating application for a field device is implemented, wherein the hardware- and/or software functionality is one of the following:
  running a driver for a field device;
  running the operating application;
  operating long-term monitoring;
  operating continuous documentation;
  providing data in databases;
  providing data in cloud systems.

The service device is, for example, a superordinated unit, for example, a control system PC, or a controller, or a PC or laptop, or a mobile service device, for example, a Field Xpert tablet PC produced and sold by the applicant, or a mobile end device, for example, an "SMT70" tablet sold by the applicant.

The operating application is, for example, a frame application, for example, an FDT frame application, for example, the software tool "Fieldcare" sold by the applicant.

BRIEF DESCRIPTION OF THE DRAWING

The invention will now be explained in greater detail based on the appended drawing, the sole FIGURE of which shows as follows:

FIG. 1 shows an example of an embodiment of the method of the present disclosure.

DETAILED DESCRIPTION

FIG. 1 shows a first time, customer-side application of an automation component AK. This particular automation component AK is an SMT70 tablet, which is being used for servicing a field device. Servicing means in the present case the reading, or writing, of parameter values of the field device, the read-out of measured values of process variables registered by the field device, the reading or writing of identification data of the field device, the reading-out of diagnostic data of the field device, etc.

For servicing of the field device, an operating program is implemented in the automation component AK. For example, the operating program is an FDT frame application, in which a device driver (DTM, "Device Type Manager") of the field device is loaded.

For executing the operating program, a proof of purchase, or proof of a valid license, is necessary. Since the automation component AK is embodied for use in critical infrastructure, such is not Internet capable. Therefore, according to the invention a service device SD, in this case, in the form of a smartphone, is used, which has access to the Internet and which can obtain the data from the automation component AK required for checking the license, without actually connecting into it.

In a first method step, the automation component produces identification information of the operating software and the automation component. As required, other data can also be acquired.

In method step ii), the automation component AK provides the identification information via an output unit OU as machine interpretable code CD ready to be queried. The machine interpretable code CD is in this example a QR code. The output unit OU is, in this case, a touch screen, which also can serve as input unit IU and which displays the QR code. Simultaneously, the automation component starts a countdown, within which time the input of a first license information in the input unit IU is expected.

In method step iii), the service device SD reads the code CD by means of a camera and interprets such, i.e. the service device extracts the identification information contained in the code CD.

Then in method step iv), the service device SD transmits the identification information via the Internet to a server SU. Such checks the identification information and generates a first license information in method step v).

The license information is then transmitted to the service device SD in a method step vi). The service device SD then outputs the license information in a method step vii) in such a manner that such is present as an alphanumeric character sequence. In the present case, an eight digit character sequence ("x24a std6") is displayed on the display of the service device SD.

In method step vii), the operator inputs this character sequence on the input unit IU, thus, the touch screen, of the automation component.

In method step viii), the automation component performs a plausibility check, when the character sequence was input within the countdown. The plausibility check includes, for example, the test of a checksum contained in the character sequence.

In case the plausibility check is successful, in a method step ix), the operating software is activated temporarily, for example, for a time period of two weeks. The operator can now service the field device by means of the automation component.

For a complete, lasting activation, the method of the invention must be repeated within the period of time of two weeks:

In method step x), the automation component produces an acknowledgment request, or query, for the license server that the operating program was temporarily activated.

In method step xi), the automation component AK provides the acknowledgment request via an output unit OU as machine interpretable code CD on the output unit OU. The machine interpretable code CD is, again, a QR code.

In method step xii), the service device SD reads the code CD by means of the camera and interprets such, i.e. the service device extracts the acknowledgment request contained in the code CD.

Then, the service device SD, in method step xiii), transmits the acknowledgment request via the Internet to a server SU. This tests such and generates in method step xiv), an acknowledgment information.

The acknowledgment information is then, in a method step xv), transmitted to the service device SD.

This outputs the acknowledgment information by means of the display again in the form of an alphanumeric character sequence.

In method step xvi), the operator inputs this character sequence on the input unit IU, thus, the touch screen, of the automation component AK.

In method step xvii), the automation component performs a plausibility check, when the character sequence was input within the countdown. In case the plausibility check is successful, the operating software, in a method step xviii), is permanently activated. Then, transmission of information to the server SU is no longer required.

The invention claimed is:

1. A method for activating or deactivating at least one of a hardware- and a software functionality of an automation component, wherein the automation component contains an input unit and an output unit, comprising:
generating an identification information of the automation component at the automation component;
providing the identification information as a first, machine interpretable code on the output unit of the automation component;
registering the provided first code using a service device via an unidirectional data channel;
transmitting the identification information from the service device to a server;
generating a first license information using the server or another unit communicating with the server;
wherein the first license information identifies supplemental functionalities of the automation component activated upon purchase by a customer, wherein the supplemental functionalities are in addition to basic functionalities;
transmitting the first license information as an alphanumeric data sequence of predetermined character length from the server to the service device;
inputting the output first license information into the automation component using the input unit; and
checking the plausibility of the first license information using the automation component; and activating at least one of the supplemental functionalities and/or deactivating at least one other of the supplemental functionalities upon successful checking of the plausibility of the first license information.

2. The method of claim 1, wherein at least one of the hardware- and the software functionality is activated temporarily for a predetermined length of time.

3. The method of claim 2, further comprising:
generating an acknowledgment request of the automation component, wherein the acknowledgment request is created upon successful checking of the plausibility of the first license information;
providing the acknowledgment request on the output unit of the automation component as a second machine interpretable code;
registering the provided second machine interpretable code using the service device via an unidirectional data channel;
transmitting the acknowledgment request from the service device to a server;
generating an acknowledgment information using of the server;
transmitting the acknowledgment information as an alphanumeric data sequence of predetermined character length from the server to the service device;
inputting the output acknowledgment information into the automation component using the input unit;
checking the plausibility of the acknowledgment information using the automation component; and
time unlimited activating or deactivating of at least one of the hardware- and the software functionality upon successful checking of the plausibility of the acknowledgment information.

4. The method of claim 1, wherein an optical code, a flicker code, or a barcode, is used as at least one of first code and second code, and wherein a display unit is used as output unit.

5. The method of claim 4, wherein the service device has a camera and wherein the unidirectional data channel is formed in that the camera registers the first optical code or the second optical code.

6. The method of claim 1, wherein an acoustic playback means is used as output unit and wherein at least one of an acoustic frequency modulated and an amplitude modulated audio signal is used as at least one of the first code and the second code.

7. The method of claim 6, wherein the service device has an acoustic receiving component, and wherein the unidirectional data channel is formed by the acoustic receiving component hearing the first acoustic code or the second acoustic code.

8. The method of claim 1, wherein the activating, or deactivating, of at least one of the hardware- and the software functionality supplementally occurs in cases in which the inputting of the output first license information occurs within a predetermined length of time after the generating of the identification information of the automation component.

9. The method of claim 3, wherein the time unlimited activating, or deactivating, of at least one of the hardware- and the software functionality supplementally occurs when the inputting of the output acknowledgment information occurs within a predetermined length of time after the generating of the acknowledgment information of the automation component.

10. The method of claim 1, wherein the service device is a laptop or a mobile end device.

11. The method of claim 1, wherein the service device is connected for communication with the server via Internet.

12. The method of claim 1, wherein the automation component is a field device utilizing a basic functionality for registering or setting a variable of a process, in which a product is made from a raw or starting material by the application of chemical, physical or biological procedures, wherein at least one of the hardware- and the software functionality is one of the following: specific measuring functionality; diagnostic functionality; parametering the field device; verifying the field device; validation of the field device; calibrating the field device; adjusting; documentation of the field device; loop-test; safety functions; start-up of the field device; shutting down the field device; servicing the field device; installing the field device; replacing the field device with another field device; commissioning the field device; maintenance of the field device; firmware updating; software updating; license updating.

* * * * *